(12) United States Patent
Yoshida

(10) Patent No.: US 8,584,127 B2
(45) Date of Patent: Nov. 12, 2013

(54) STORAGE MEDIUM STORING JOB MANAGEMENT PROGRAM, INFORMATION PROCESSING APPARATUS, AND JOB MANAGEMENT METHOD

(75) Inventor: Taketoshi Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1083 days.

(21) Appl. No.: 12/367,294

(22) Filed: Feb. 6, 2009

(65) Prior Publication Data

US 2009/0228889 A1 Sep. 10, 2009

(30) Foreign Application Priority Data

Mar. 10, 2008 (JP) .................................. 2008-59656

(51) Int. Cl.
G06F 9/46 (2006.01)

(52) U.S. Cl.
USPC .......................................... 718/102; 718/101

(58) Field of Classification Search
None
See application file for complete search history.

(56) References Cited

U.S. PATENT DOCUMENTS

| | | | | |
|---|---|---|---|---|
| 6,463,457 B1 * | 10/2002 | Armentrout et al. | ........... | 709/201 |
| 6,694,345 B1 * | 2/2004 | Brelsford et al. | ............. | 718/100 |
| 7,243,121 B2 * | 7/2007 | Neiman et al. | ................. | 709/201 |
| 7,243,352 B2 * | 7/2007 | Mandava et al. | ............... | 718/104 |
| 8,205,205 B2 * | 6/2012 | Franke | ........................... | 718/103 |
| 2004/0073836 A1 * | 4/2004 | Shimada | ......................... | 714/25 |
| 2004/0123296 A1 | 6/2004 | Challenger et al. | | |
| 2004/0128670 A1 | 7/2004 | Robinson et al. | | |
| 2005/0060704 A1 * | 3/2005 | Bulson et al. | ...................... | 718/1 |
| 2005/0081097 A1 * | 4/2005 | Bacher et al. | .................... | 714/13 |
| 2005/0198303 A1 * | 9/2005 | Knauerhase et al. | ......... | 709/227 |
| 2006/0070067 A1 * | 3/2006 | Lowery | .......................... | 718/100 |

FOREIGN PATENT DOCUMENTS

| | | |
|---|---|---|
| JP | B2 6-64538 | 8/1994 |
| JP | 11-353284 | 12/1999 |
| JP | 2001-166956 | 6/2001 |
| JP | A 2004-206712 | 7/2004 |
| JP | A 2006-519423 | 8/2006 |
| WO | WO 2004/095272 A1 | 11/2004 |
| WO | WO 2007/108062 | 9/2007 |

OTHER PUBLICATIONS

Figueiredo, Renato J., et al, A Case for Grid Computing on Virtual Machines, 2003, IEEE, Proc. of the 23 Intl. Conf. of Distribued Computing Systems, 10 pages.*
Japanese office action issued in corresponding Japanese App. No. 2008-059656, dated Feb. 7, 2012.

* cited by examiner

Primary Examiner — Eric Coleman
(74) Attorney, Agent, or Firm — Greer, Burns & Crain, Ltd.

(57) ABSTRACT

A physical machine executes a job on a virtual machine operated on the physical machine. A management apparatus manages execution of the job and a state of a computation resource of the physical machine. The management apparatus has a job execution request inputting unit for inputting or re-inputting into the physical machine a request for execution of the job without using an OS (Operating System) of the physical machine. The physical machine has a job inputting unit for inputting or re-inputting into the virtual machine the job in response to the request for execution of the job input or re-input into the physical machine by the job execution request inputting unit.

20 Claims, 5 Drawing Sheets

FIG. 4

| VIRTUAL MACHINE STATE | CHILD JOB ID | VIRTUAL MACHINE ID | VIRTUAL MACHINE IMAGE FILE STORAGE LOCATION | VIRTUAL MACHINE NETWORK ID | PARENT JOB ID |
|---|---|---|---|---|---|
| CHECK (BEING CHECKPOINTED) | z=f | win#1 | /home/vm1/vm1@mst1 | 192.168.0.2 | x=a, y=c |
| EXE (BEING EXECUTED) | z=g | lin#4 | /home/vm2/vm2@mst2 | 192.168.0.25 | x=a, y=b |
| NULL (JOB UNALLOCATION BEING STOPPED) | z=h | cent#0 | /home/vm3/vm3@mst2 | 192.168.0.3 | x=e, y=d |
| WAIT (JOB UNALLOCATION BEING STARTED) | z=i | lin#5 | /home/vm5/vm5@mst3 | 192.168.0.100 | x=k, y=e |
| ... | ... | ... | ... | ... | ... |

400a

STORAGE MEDIUM STORING JOB MANAGEMENT PROGRAM, INFORMATION PROCESSING APPARATUS, AND JOB MANAGEMENT METHOD

CROSS-REFERENCES TO RELATED APPLICATIONS

This application is related to and claims priority to Japanese patent application no. 2008-59656 filed on Mar. 10, 2008 in the Japan Patent Office, and incorporated by reference herein.

BACKGROUND

1. Field

The embodiments discussed herein are directed to management of execution of a job.

2. Description of the Related Art

In order to perform an enormous amount of computation, a method of executing a job including a plurality of processing units is used in computers (large general-purpose computers, in particular). The processing time of the job varies from a few hours to several weeks.

Accordingly, in some cases, it is required to suspend and restart execution of the job (perform the checkpointing and restart of the job) for some reason. The suspended job has to be restarted without fail. It is therefore important to manage and control the suspended job.

As a method of suspending execution of a job in a large general-purpose computer, for example, a job suspending method of allowing a virtual machine data processing system to perform the checkpointing and restart of a single job using a signal has been proposed.

Currently, information processing systems called grid computing systems in which computer apparatuses connected to a network cooperate with each other are becoming increasing popular.

In such a grid computing system, the load of an enormous amount of computation is distributed to computer apparatuses so as to cause the computer apparatuses to cooperate to perform the computation. Accordingly, as compared with large general-purpose computers in the related art, grid computing systems can perform computation processing at lower cost and in a shorter time.

However, each computer apparatus included in a grid computing system is preferentially used by a user of the computer apparatus. Accordingly, if a certain computer apparatus is being used by a user of the computer apparatus, it is required to suspend execution of a job in the computer apparatus when working with computers in the grid system. Furthermore, it is required to manage the suspended job so as to restart the suspended job.

For example, a dynamic service registry for a virtual machine has been proposed in which, when a virtual machine on a computer apparatus for executing a job instructs the checkpointing or restart of a job, a user of the computer apparatus serving as a computer resource notifies a management apparatus for a grid computing system of the instruction.

A topology aware grid services scheduler architecture for managing control of the checkpointing and restart of an online application using a Web service in a grid computing system has been proposed.

However, in the related art, there are the following problems. If a computation resource is operated by a specific OS (Operating System) such as an open-source OS, it is possible to manage and control the checkpointing and restart of a job.

However, if a computation resource is operated by a non-open-source OS, it is impossible to manage and control the checkpointing and restart of a job. Even if a computation resource is operated by an open-source OS, it is required to install a specific library. In this case, if there is no source code of a job, it is impossible to perform checkpointing of a job.

It is an object of the present invention to effectively perform the checkpointing and restart of a job in a grid computing system without using an OS of each computer apparatus serving as a computer resource.

SUMMARY

A physical machine executes a job on a virtual machine operated on the physical machine. A management apparatus manages execution of the job and a state of a computation resource of the physical machine. The management apparatus has a job execution request inputting unit for inputting or re-inputting into the physical machine a request for execution of the job without using an OS (Operating System) of the physical machine. The physical machine has a job inputting unit for inputting or re-inputting into the virtual machine the job in response to the request for execution of the job input or re-input into the physical machine by the job execution request inputting unit.

BRIEF DESCRIPTION OF THE DRAWINGS

Embodiments are illustrated by way of example and not limited by the following figures.

FIG. 4 is a diagram illustrating an example of a virtual machine shared file management table of an embodiment of the present invention;

DESCRIPTION OF THE PREFERRED EMBODIMENTS

An embodiment of the present invention will be described in detail below with reference to the accompanying drawings. An information processing system to be described is a grid computing system causing computer apparatuses connected to a wide area network such as the Internet to cooperate with each other and function as a single high-speed computing apparatus. However, an information processing system according to an embodiment of the present invention may be a parallel computer causing a plurality of computer apparatuses to be connected to each other and cooperate with each other.

The term "parent job" to be used in the following description refers to a pseudo job that is directly input into a batch system. The term "child job" to be used in the following description refers to a substantial job that is input in response to a job execution command transmitted from the parent job input into the batch system.

The term "migration" refers to a process from a checkpointing of a job to a restart of the job which is performed in a case in which it is required to suspend execution of the job in a computer apparatus serving as a computation resource. In particular, in an embodiment of the present invention, since there is a case in which the restart of the job is performed by another computer apparatus, the process from the checkpointing of the job to the restart of the job is called "migration".

Figure 1:
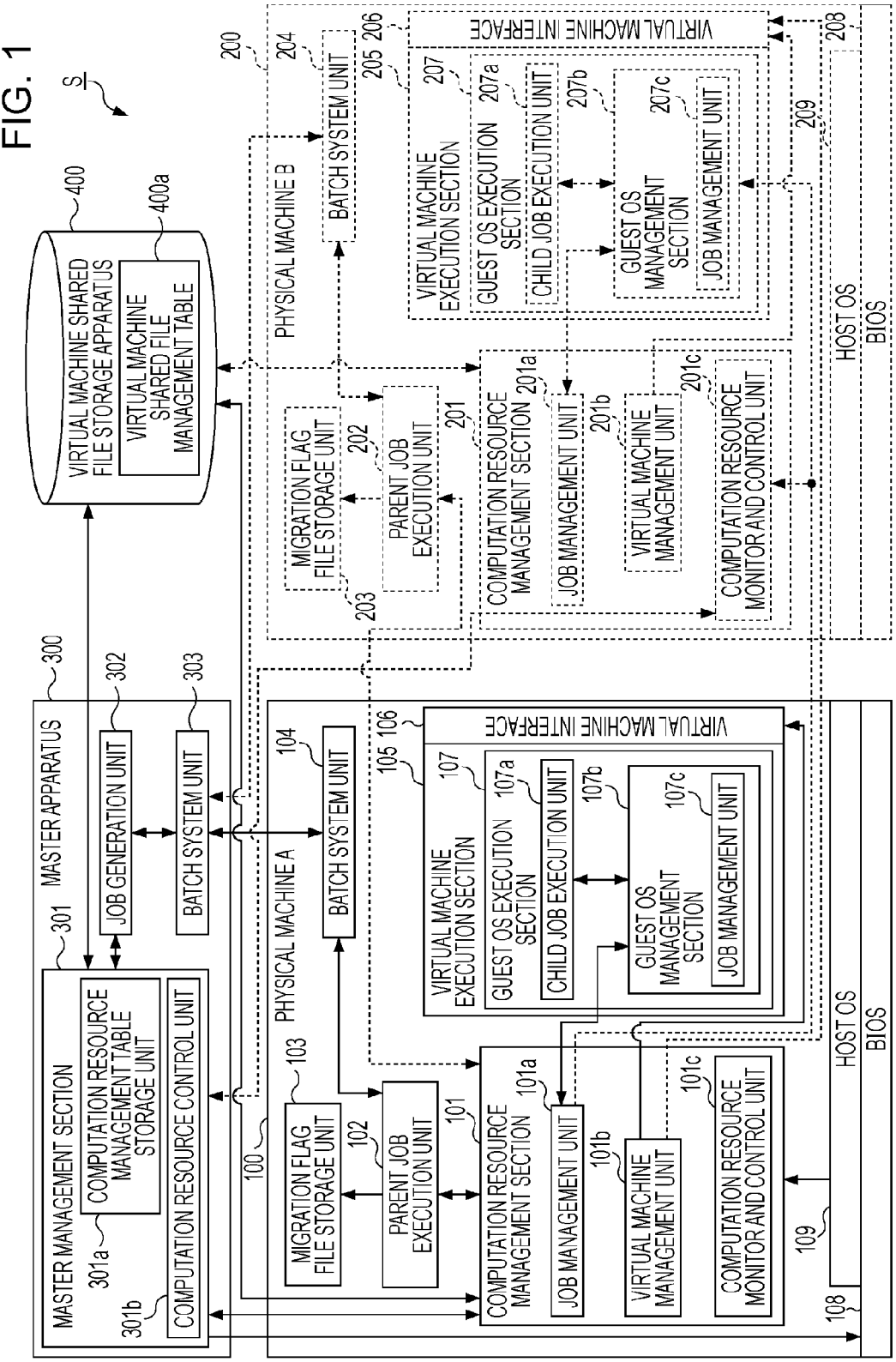
FIG. 1 is a block diagram illustrating a configuration of an information processing system according to an embodiment of the present invention.

A configuration of an information processing system according to an embodiment of the present invention will be described. FIG. 1 is a block diagram illustrating a configuration of an information processing system according to an embodiment of the present invention. In an information processing system S according to an embodiment of the present invention, a physical machine A 100, a physical machine B 200, a master apparatus 300, and a virtual machine shared file storage apparatus 400 are connected to each other via a network so that they can communicate with each other. The physical machine A 100, the physical machine B 200, the master apparatus 300, and the virtual machine shared file storage apparatus 400 form a single computing apparatus.

Each of the physical machine A 100 and the physical machine B 200 (hereinafter collectively called physical machines 150) is a computer apparatus for executing a job included in the information processing system S. In an embodiment of the present invention, for convenience of explanation, the physical machine A 100 and the physical machine B 200 have the same configuration. In the physical machine B 200, reference numerals obtained by adding "100" to reference numerals in the physical machine A 100 are used to represent the same components.

In an embodiment of the present invention, a description will be made under the assumption that the information processing system S includes two physical machines, that is, the physical machine A 100 and the physical machine B 200. However, the information processing system S may include many physical machines.

The master apparatus 300 is a control apparatus for performing overall control of the information processing system S. The virtual machine shared file storage apparatus 400 is shared by these apparatuses included in the information processing system S, and stores a virtual machine shared file management table 400a. In an embodiment of the present invention, a description will be made under the assumption that the virtual machine shared file storage apparatus 400 is a separate apparatus in the information processing system S. However, the virtual machine shared file storage apparatus 400 and the master apparatus 300, or the virtual machine shared file storage apparatus 400 and representative one of the physical machines 150 may be integrated.

Since the physical machine A 100 and the physical machine B 200 have the same configuration, the configuration of the physical machine 150 will be described using the physical machine A 100. The physical machine A 100 includes a computation resource management section 101, a parent job execution unit 102, a migration flag file storage unit 103, and a batch system unit 104 which operate on a BIOS 108 and a host OS 109.

The computation resource management section 101 transmits to a job management unit 107c included in a guest OS execution section 107 binary data of a child job transmitted from the parent job execution unit 102, a parameter, and necessary files for execution of the child job, thereby requesting the job management unit 107c to execute the child job. The computation resource management section 101 notifies the parent job execution unit 102 of the processing result of the child job. As a result, execution environments for the parent job and the child job can be independent of each other, and the scope of selection of OSes used for execution of the child job can be expanded.

The computation resource management section 101 includes a job management unit 101a, a virtual machine management unit 101b, and a computation resource monitor and control unit 101c. The job management unit 101a executes a child job in response to a child job execution command transmitted from the parent job execution unit 102, and transmits the result of execution of the child job to the parent job execution unit 102.

The virtual machine management unit 101b activates or deactivates a virtual machine on the basis of information stored in the virtual machine shared file management table 400a. As a result, a virtual machine image file required for a child job can be effectively managed.

That is, the virtual machine management unit 101b starts a guest OS that is a platform used for execution of a virtual machine and activates a virtual machine. The virtual machine management unit 101b deactivates and activates the virtual machine execution section 105 when performing migration. Thus, the virtual machine management unit 101b manages activation and deactivation of the virtual machine.

The virtual machine management unit 101b also controls the batch system unit 104. As compared with a case in which these functions are provided for a parent job, the management of a virtual machine and the control of a job can be performed more reliably and precisely.

The computation resource monitor and control unit 101c acquires from the host OS 109, for example, information about the usage of a mouse or keyboard and information about the login/logoff status of a user as pieces of determination information for migration, transmits the acquired pieces of determination information to a master management section 301, and receives from the master management section 301 a determination result of migration. Thus, the computation resource monitor and control unit 101c can correctively and effectively manage policies of migration.

That is, the computation resource monitor and control unit 101c monitors the status (including the usage of an input device such as a mouse or keyboard, the utilization factor of a CPU (Central Processing Unit), the utilization factor of a memory, and the utilization factor of a virtual memory) of the computation resource of the physical machine A 100. If the computation resource monitor and control unit 101c is notified by the host OS 109 that a user has logged into the physical machine A 100, the computation resource monitor and control unit 101c instructs the virtual machine management unit 101b to stop the execution of a job in the child job execution unit 107a so as to stop the function of the virtual machine execution section 105.

The parent job execution unit 102 executes a parent job in accordance with an instruction transmitted from batch system unit 104. The batch system unit 104 transmits the instruction to the parent job execution unit 102 in response to a parent job execution command transmitted from the master apparatus 300. The parent job execution unit 102 starts to execute a parent job and registers the ID of a child job corresponding to the parent job in a migration flag file stored in the migration flag file storage unit 103.

Figure 2:
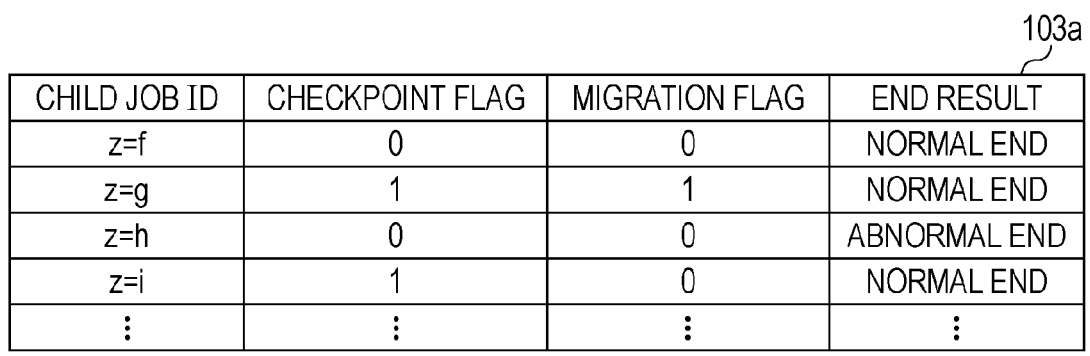
FIG. 2 is a diagram illustrating an example of a migration flag file according to an embodiment of the present invention.

As illustrated in FIG. 2, in the migration flag file, there are a child job ID column, a checkpoint flag column, a migration flag column, and an end result column. For example, referring to FIG. 2, in the case of an entry having the child job ID of "z=f", the checkpoint flag is "0 (off)", the migration flag is "0", and the end result is "normal end".

The parent job execution unit 102 causes the job management unit 101a to transmit a request for start of a child job to the guest OS management section 107b. The child job is started by the guest OS management section 107b and is then executed by the child job execution unit 107a. The parent job execution unit 102 receives an execution result of the child job from the child job execution unit 107a, and notifies a job generation unit 302 of the execution result of the child job via the batch system unit and a batch system unit 303.

In this case, a user views only the parent job execution unit 102 through the batch system units 104 and 303. Accordingly, the checkpointing and restart of the child job can be hidden from these batch systems. The control of a job can be effectively performed without affecting these batch systems.

If the parent job execution unit 102 receives from the job management unit 101a a notification that the execution of the child job has been stopped in the virtual machine execution section 105, the parent job execution unit 102 sets a checkpoint flag corresponding to the ID of the stopped child job to ON in the migration flag file.

If the parent job execution unit 102 receives from the master apparatus 300 a notification that the job stopped in the physical machine A 100 will be executed by another physical machine, the parent job execution unit 102 sets a migration flag corresponding to the ID of the stopped child job to ON in the migration flag file.

If the parent job execution unit 102 receives from the job management unit 101a a notification that the execution of the child job has been completed in the virtual machine execution section 105 and an execution result of the child job, the parent job execution unit 102 registers the execution result as an execution result corresponding to the ID of the child job in the migration flag file.

The batch system unit 104 analyzes a batch job input from the batch system unit 303 included in the master apparatus 300, and causes the parent job execution unit 102 to execute a parent job corresponding to the batch job. The batch system unit 104 receives an execution result of the parent job from the parent job execution unit 102, and transmits the execution result to the batch system unit 303.

The physical machine A 100 includes a virtual machine execution section 105 for starting a guest OS, which is different from the host OS 109, as a virtual machine. The virtual machine execution section 105 includes a virtual machine interface 106 and a guest OS execution section 107. The guest OS execution section 107 includes a child job execution unit 107a and a guest OS management section 107b. The guest OS management section 107b includes a job management unit 107c.

The virtual machine interface 106 is used to activate or deactivate a virtual machine as a guest OS on the basis of a virtual machine image file stored in the virtual machine shared file management table 400a. The virtual machine interface 106 controls a virtual machine in response to a request transmitted from the virtual machine management unit 101b included in the computation resource management section 101.

The guest OS execution section 107 is a virtual machine operated by the virtual machine execution section 105. The child job execution unit 107a executes a child job that is an actual job. A child job is executed by the child job execution unit 107a separately from a parent job, whereby the performance of actual processing can be hidden from the batch system units 104 and 303. The guest OS, which is an OS used to execute a child job, is independent of the host OS 109. Accordingly, the scope of selection of OSes used for execution of a child job can be expanded.

The guest OS management section 107b supports the job management unit 101a included in the computation resource management section 101 by communicating with the host OS 109 and storing an execution result of a child job on the guest OS. As a result, the load on the job management unit 101a can be lightened.

The job management unit 107c included in the guest OS management section 107b receives from the job management unit 101a included in the computation resource management section 101 necessary pieces of information (the binary data of a child job, an argument, and a file) for execution of a child job, and executes a child job on the guest OS execution section 107.

The job management unit 107c transmits an execution result of a child job to the job management unit 101a in response to a request transmitted from the job management unit 101a. If the execution of a child job is completed before a request is transmitted from the job management unit 101a to the job management unit 107c, the job management unit 107c stores the execution result. Subsequently, the job management unit 107c transmits the execution result to the job management unit 101a in response to a request transmitted from the job management unit 101a. As a result, a child job can be effectively executed separately from a parent job.

The master apparatus 300 includes a master management section 301, the job generation unit 302, and the batch system unit 303. The master management section 301 includes a computation resource management table storage unit 301a and a computation resource control unit 301b.

Figure 3:
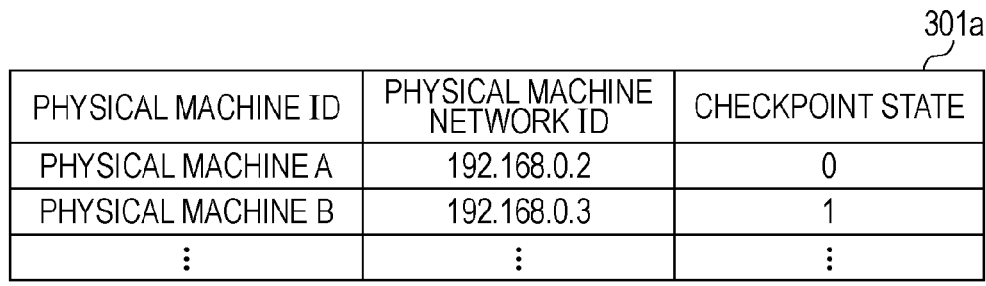
FIG. 3 is a diagram illustrating an example of a computation resource management table according to an embodiment of the present invention.

As illustrated in FIG. 3, the computation resource management table storage unit 301a stores a computation resource management table including physical machine IDs, physical machine network IDs, and checkpoint states of all physical machines managed by the master apparatus 300.

The physical machine ID is used to identify a physical machine. The physical machine network ID is used to identify the physical machine on a network. The checkpoint state is represented by a value of a flag. If all virtual machines operating in the physical machine execute child jobs or the functions of all the virtual machines are stopped, the value of a flag is set to 1. In other cases, the value of the flag is set to 0.

The computation resource control unit 301b transmits a migration execution command to the computation resource management section 101 on the basis of pieces of information (information about the usage of a keyboard or mouse and information about the login/logoff status of a user) transmitted from each physical machine serving as a computation resource. As a result, the management policy of each physical machine serving as a computation resource can be effectively executed.

The job generation unit 302 generates a batch job to be input into a physical machine instructed by the master management section 301. The batch system unit 303 transmits the batch job generated by the job generation unit 302 to, for example, the batch system unit 104 included in the physical machine A 100.

The virtual machine shared file management table 400a stored in the virtual machine shared file storage apparatus is a table used to manage the relationship between a child job and the image file of a virtual machine executing the child job. The virtual machine shared file management table 400a includes information about the current state of the virtual machine (virtual machine state), and is used to effectively perform migration.

As illustrated in FIG. 4, the virtual machine shared file management table 400a has a virtual machine state column, a child job ID column, a virtual machine ID column, a virtual machine image file storage location column, a virtual machine network ID column, and a parent job ID column.

For example, in the case of a virtual machine having a virtual machine state of "CHECK (being checkpointed)", a child job having a child job ID of "z=f" is assigned to the virtual machine and the virtual machine ID of the virtual machine is "win#1". The image file of the virtual machine is specified by "/home/vm1/vm1@mst1". A virtual machine network ID is information used to identify the virtual machine on a network. The ID of a parent job for the child job is "x=a, y=c".

Figure 5:
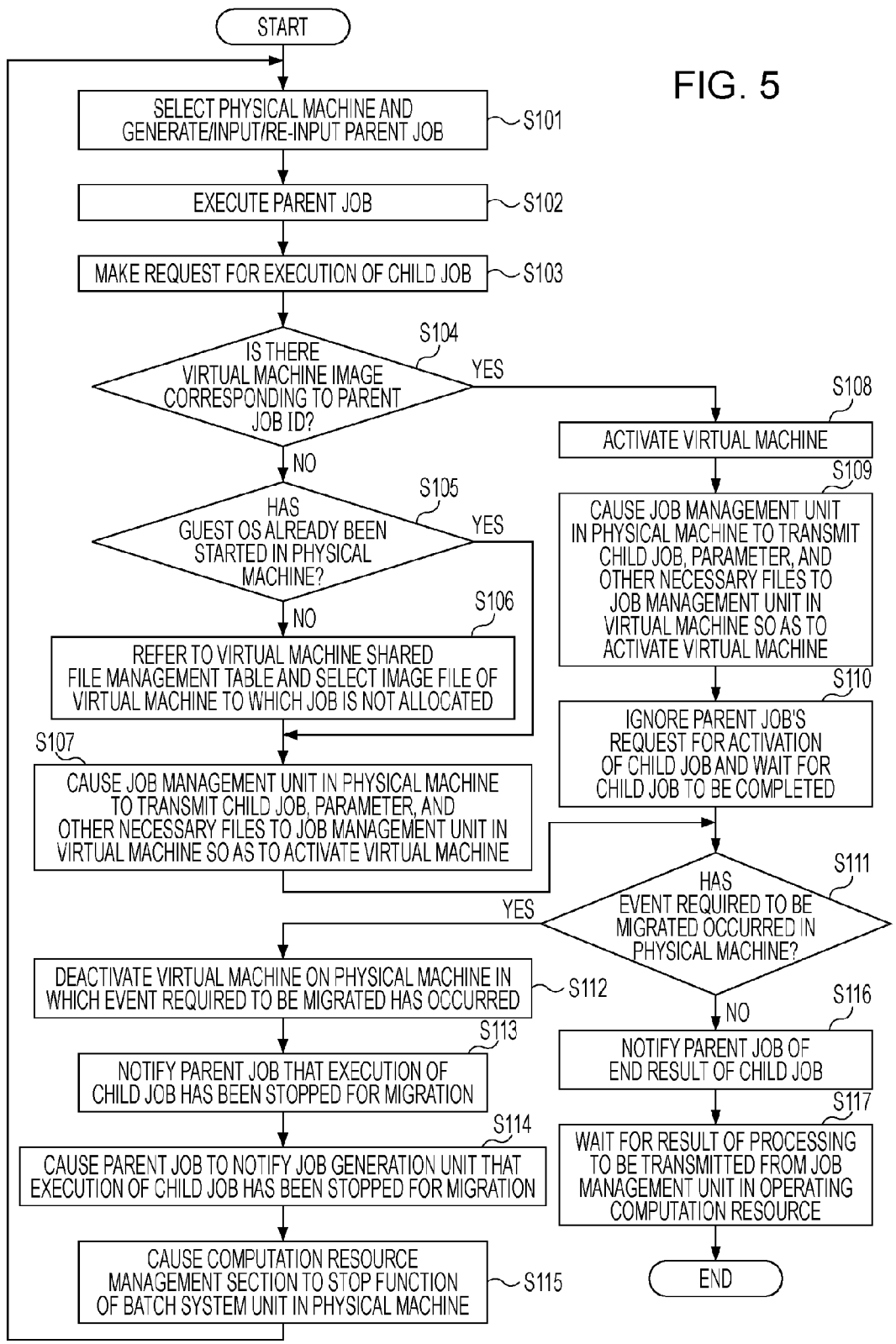
FIG. 5 is a flowchart illustrating a job management process performed in an information processing system according to an embodiment of the present invention.

Next, a job management process performed in an information processing system according to an embodiment of the present invention will be described. FIG. 5 is a flowchart illustrating a job management process performed in an information processing system according to an embodiment of the present invention.

In the following job management process, a job is executed in a virtual machine on the physical machine A 100. If migration of the job is required, migration of the job from the physical machine A 100 to the physical machine B 200 is performed.

However, another job management process of selecting a physical machine that is a computation resource capable of executing a job, executing a job in a virtual machine on the selected physical machine, selecting another physical machine that is a computation resource capable of executing a job when migration of the job is required, and executing the job in a virtual machine on the other physical machine may be performed.

As illustrated in FIG. 5, the job generation unit 302 included in the master apparatus 300 selects a physical machine capable of executing a job from among physical machines that are computation resources managed by the master apparatus 300, generates a parent job, and inputs or re-inputs the generated parent job into the selected physical machine (step S101).

The batch system unit 104 included in the physical machine A 100 causes the parent job execution unit 102 to execute the parent job in accordance with an instruction transmitted from the batch system unit 303 included in the master apparatus 300 (step S102).

The parent job execution unit 102 requests the computation resource management section 101 to execute a child job corresponding to the parent job (step S103). The virtual machine management unit 101b refers to the virtual machine shared file management table 400a so as to determine whether there is a virtual machine image corresponding to the ID of the parent job (step S104).

If it is determined in step S104 that there is a virtual machine image corresponding to the ID of the parent job, the process proceeds to step S108. If it is not determined in step S104 that there is a virtual machine image corresponding to the ID of the parent job, the process proceeds to step S105.

In step S105, the virtual machine management unit 101b determines whether a guest OS has already been started in, for example, the physical machine A 100. If it is determined in step S105 that a guest OS has already been started in the physical machine A 100, the process proceeds to step S107. If it is not determined in step S105 that a guest OS has already been started in the physical machine A 100, the process proceeds to step S106.

In step S106, the virtual machine management unit 101b selects an image file of a virtual machine to which a job is not allocated from the virtual machine shared file management table 400a, and activates a virtual machine (the virtual machine execution section 105) in the physical machine A 100.

In step S107, the job management unit 101a included in the computation resource management section 101 transmits the child job, a parameter, and other necessary files to the job management unit 107c included in the guest OS management section 107b.

The job management unit 107c included in the guest OS management section 107b starts the child job using the received child job, the received parameter, and the received other necessary files (step S107). Subsequently, the process proceeds to step S111. The started child job is executed in the child job execution unit 107a.

On the other hand, in step S108, the virtual machine management unit 101b selects a virtual machine image corresponding to the ID of the parent job from the virtual machine shared file management table 400a, and activates a virtual machine in, for example, the physical machine A 100.

The job management unit 101a included in the computation resource management section 101 transmits the child job, a parameter, and other necessary files to the job management unit 107c included in the guest OS management section 107b.

The job management unit 107c included in the guest OS management section 107b starts the child job using the received child job, the received parameter, and the received other necessary files (step S109). The started child job is executed in the child job execution unit 107a.

The job management unit 101a ignores a child job start request transmitted from the parent job, and waits for the completion of the child job (step S110). The computation resource monitor and control unit 101c determines whether an event for which migration of a job is required has occurred in the physical machine A 100 (step S111).

If it is determined in step S111 that an event for which migration of a job is required has occurred, the process proceeds to step S112. If it is not determined in step S111 that an event for which migration of a job is required has occurred, the process proceeds to step S116.

In step S112, the virtual machine management unit 101b deactivates the virtual machine on the physical machine A 100 where the event for which migration of a job is required has occurred. The job management unit 101a notifies the parent job execution unit 102 that the execution of the child job has been stopped for the purpose of migration (step S113).

The parent job execution unit 102, which has been notified by the job management unit 101a that the execution of the child job has been stopped, notifies the job generation unit 302 included in the master apparatus 300 via the batch system units 104 and 303 that the execution of the child job has been stopped for the purpose of migration (step S114).

The computation resource management section 101 stops the function of the batch system unit 104 included in the physical machine A 100 (step S115). Subsequently, the process proceeds to step S101. In step S101, the job generation unit 302 generates a parent job corresponding to the child job stopped in step S112, and re-inputs the generated parent job into the batch system unit 303.

On the other hand, in step S116, the job management unit 101a receives an end result of the child job from the child job execution unit 107a via the guest OS management section 107b, and notifies the parent job execution unit 102 of the end result.

The master management section 301 included in the master apparatus 300 receives a result of job processing from the job management unit 101a included in an operating physical machine (for example, the physical machine A 100) (step S117). Subsequently, the job management process ends.

Figure 6:
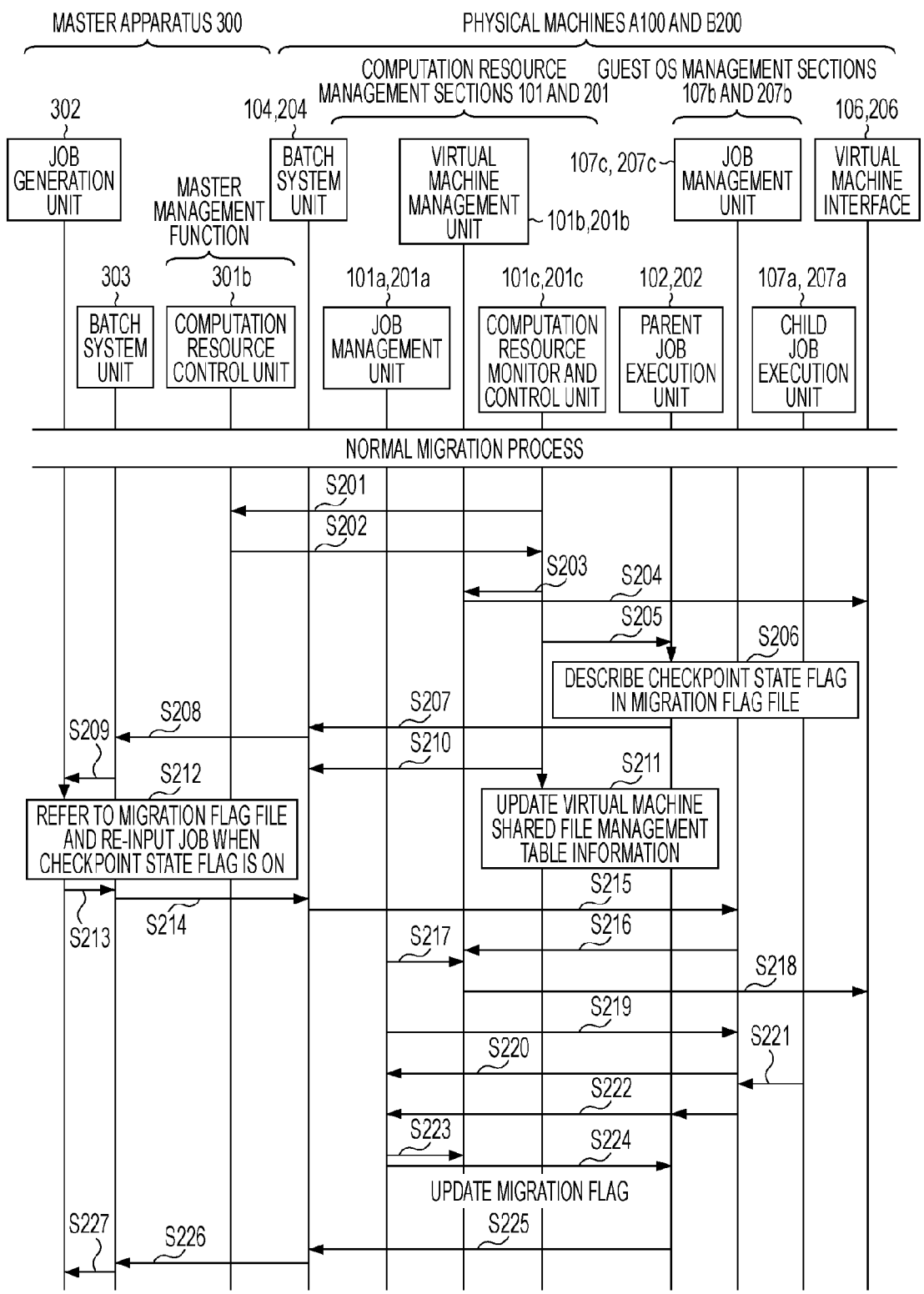
FIG. 6 is a sequence diagram illustrating a job management process performed in an information processing system according to an embodiment of the present invention.

Next, a job management process performed in a parallel computer system according to an embodiment of the present invention will be described with reference to a sequence diagram. FIG. 6 is a sequence diagram illustrating a job management process performed in an image processing system according to an embodiment of the present invention.

Referring to FIG. 6, the job generation unit 302 generates a parent job including necessary files for execution of a child job and a parameter, and inputs the generated parent job into the batch system unit 303. The batch system unit 104 included in the physical machine A 100 executes the parent job. The parent job requests the job management unit 101*a* to start a child job. The child job execution unit 107*a* included in the guest OS execution section 107 starts the child job. The above-described process corresponds to the normal job management process illustrated in FIG. 5. It is assumed that a user logs into the physical machine A 100 under these circumstances.

First, the computation resource monitor and control unit 101*c* included in the physical machine A 100 detects log-in of the user, and notifies the computation resource control unit 301*b* included in the master apparatus 300 of the log-in of the user (step S201). The computation resource control unit 301*b* transmits a request for checkpointing to the computation resource monitor and control unit 101*c* included in the physical machine A 100 in accordance with a migration policy (step S202).

Upon receiving the request for checkpointing, the computation resource monitor and control unit 101*c* transmits a request to stop execution of a guest OS to the virtual machine management unit 101*b* (step S203). The virtual machine management unit 101*b* transmits the request to stop execution of a guest OS to the virtual machine execution section 105 via the virtual machine interface 106, so that the function of the guest OS execution section 107 included in the virtual machine execution section 105 is stopped (step S204).

The computation resource monitor and control unit 101*c* transmits a checkpoint notification to the parent job execution unit 102 (step S205). Upon receiving the checkpoint notification, the parent job execution unit 102 sets a flag indicating a checkpoint state to ON in a migration flag file and terminates execution of a job (stop S206).

The above-described result is transmitted to the job generation unit 302 via the batch system units 104 and 303 (steps 207, 208, and 209). The computation resource monitor and control unit 101*c* deactivates the batch system unit 104 (step S210).

The computation resource monitor and control unit 101*c* describes the ID of a child job and "CHECK" indicating that the child job is being checkpointed in a child job ID column and a virtual machine state column corresponding to a corresponding virtual machine ID, respectively (step S211).

Upon receiving a notification that execution of the job has been stopped, the job generation unit 302 refers to a migration flag file 103*a*. If a flag indicating the checkpoint state is ON, the job generation unit 302 re-inputs the same parent job into the batch system unit 303 (step S212).

The parent job, which has been re-input into the batch system unit 303 in step S213, is input into the physical machine B 200 by the batch system unit 303 (step S214). The reason for this is that the batch system unit 104 included in the physical machine A 100 is stopped and the job cannot be input into the physical machine A 100.

If the re-input parent job is started in the batch system unit 204 included in the physical machine B 200, a parameter and files which are necessary for execution of a child job are transmitted to the job management unit 207*c* operating on the host OS 209 (step S215).

The job management unit 207*c* receives the parameter and the files which are necessary for execution of a child job, refers to the virtual machine shared file management table 400*a*, specify a virtual image file including the child job, and request the virtual machine management unit 201*b* to activate a virtual machine corresponding to the specified virtual machine image file (step S216).

The virtual machine management unit 201*b* refers to the virtual machine shared file management table 400*a* on the basis of the ID of the child job, specifies a virtual machine image file, and activates a virtual machine corresponding to the specified virtual machine image file as a guest OS. In a case that another guest OS has already been started, the virtual machine management unit 201*b* activates a "no guest" OS flag (step S217).

The virtual machine management unit 201*b* requests the virtual machine execution section 205 via the virtual machine interface 206 to activate a virtual machine corresponding to the ID of the child job on the guest OS (step S218).

The job management unit 201*a* makes an inquiry to the job management unit 207*c* included in the guest OS management section 207*b* about whether the same job has already been started (step S219). In a case that the same job has already been started, the job management unit 201*a* notifies the job management unit 207*c* that a job having the ID of the child job has already been started (step S220). In this case, the job management unit 207*c* ignores a child job start request transmitted from the parent job, and waits for the completion of the child job.

In a case that the child job has already been completed, the guest OS management section 207*b* acquires a job execution result stored in the job management unit 207*c* included in the guest OS management section 207*b*. The guest OS management section 207*b* notifies the job management unit 207*c* included in the guest OS management section 207*b* that execution of the child job has been completed (step S221).

If the job management unit 207*c* is notified by the guest OS management section 207*b* that execution of the child job has been completed, the job management unit 207*c* notifies the job management unit 201*a* on the host OS 209 that execution of the child job has been completed. The job management unit 207*c* notifies the parent job execution unit 202 and the job management unit 201*a* of the execution result of the child job (step S222).

The job management unit 201*a* notifies the virtual machine management unit 201*b* and the parent job execution unit 202 that execution of the child job has been completed (steps S223 and S224). The virtual machine management unit 201*b* deletes a corresponding child job ID stored in the virtual machine shared file management table 400*a*. If the parent job execution unit 202 is notified that execution of the child job has been completed, the parent job execution unit 202 describes a message indicating that execution of the child job has normally been completed in the migration flag file 103*a*.

The parent job execution unit 202 notifies the job generation unit 302 via the batch system units 204 and 303 of the end result of the parent job (steps S225, S226, and S227).

According to an embodiment of the present invention, even if job processing is suspended by a computer apparatus that is a computation resource in a grid computation system, the job processing can be continued in another computer apparatus that is another computer resource. Accordingly, a job processing time can be shortened, and the throughput of the grid computing system can be enhanced.

Although an embodiment of the present invention has been described, the present invention is not limited thereto. Various embodiments may be implemented within the scope and spirit of the present invention. It should be noted that the advantages described in an embodiment are not limiting.

Of the individual processes described in the above-described embodiment, all or some of the processes described as being automatically performed may be manually performed, or all or some of the processes described as being manually performed may be automatically performed by a known method. In addition, the processing procedure, the control procedure, the specific names, and information including various pieces of data or parameters described in the above-described embodiment may be arbitrarily changed unless otherwise particularly specified.

The elements included in each illustrated apparatus are merely functional and conceptual elements, and do not necessarily have to be physically configured as illustrated in the drawings. That is, the specific forms of distribution/integration of the apparatuses are not limited to those illustrated in the drawings. All or some of these apparatuses may be functionally or physically distributed/integrated in any form in accordance with various loads and the use state.

All or arbitrary part of the processing functions performed by the individual apparatuses may be realized by a CPU (or a microcomputer such as an MPU (Micro Processing Unit) or an MCU (Micro Controller Unit)) and a program analyzed and executed by the CPU, or may be realized as wired logic hardware.

What is claimed is:

1. A non-transitory computer-readable recording medium storing a program for managing a job executed by a plurality of computers, the program causing a processor to execute a process comprising:
   inputting or re-inputting into a first computer, which is operated by a first operating system, a request for execution of the job, wherein said first computer includes a virtual machine operated by a second operating system independent of the first operating system;
   executing the job in the virtual machine using the second operating system;
   storing an identifier of the job and information about a current state of the first computer associated with the identifier in a memory shared by the plurality of computers,
   determining whether to execute the job again by referring to the information about the current state of the first computer corresponding to the information which identifies the job, when a notice of an end of the job is received from the first computer, and
   inputting or re-inputting into a second computer, which is different from the first computer, the request for execution of the job, when a determination is made to execute the job again.

2. The non-transitory computer-readable recording medium according to claim 1, wherein the process further comprises:
   selecting the second computer having a computation resource whose state enables the execution of the job from among the plurality of computers having computation resources before the request for execution of the job is input or re-input into the second computer.

3. The non-transitory computer-readable recording medium according to claim 1, wherein the process further comprises:
   causing the first computer to activate the virtual machine when the virtual machine is not activated on the first computer.

4. The non-transitory computer-readable recording medium according to claim 3, wherein the process further comprises:
   causing the virtual machine to output to the second computer on which the virtual machine operates an execution result of the job that has been input into the virtual machine in response to the request for execution of the job input or re-input into the second computer; and
   causing the second computer to notify the processor of the execution result of the job that has been output to the second computer on which the virtual machine operates.

5. The non-transitory computer-readable recording medium according to claim 4, wherein the process further comprises:
   causing the virtual machine to store the execution result of the job that has been input or re-input into the virtual machine, and
   wherein, when the request for execution of the job is input or re-input into the second computer, the execution result of the job stored by the virtual machine is transmitted to the second computer.

6. The non-transitory computer-readable recording medium according to claim 1, wherein the process further comprises:
   determining whether a state of a computation resource of the first computer is a state in which the execution of the job corresponding to the request for execution of the job input into the first computer can be continued on the first computer; and
   when it is not determined that execution of the job can be continued, causing the first computer to stop execution of the job.

7. The non-transitory computer-readable recording medium according to claim 6, wherein the selecting procedure includes selecting the second computer into which the job stopped by the first computer can be re-input.

8. The non-transitory computer-readable recording medium according to claim 3, wherein the storing of the identifier of the job further includes storing an address of a storage location of an image file of the virtual machine, a name of the image file, and a network identifier of the first computer, associated with each other.

9. An information processing system comprising:
   a plurality of computers,
   a memory shared by the plurality of computers, and
   a processor to execute a process including:
   inputting or re-inputting into a first computer, which is operated by a first operating system, a request for execution of a job, wherein said first computer includes a virtual machine operated by a second operating system independent of the first operating system;
   executing the job in the virtual machine using the second operating system;
   storing an identifier of the job and information about a current state of the first computer associated with the identifier in a memory,
   determining whether to execute the job again by referring to the information about the current state of the first computer corresponding to the information which identifies the job, when a notice of an end of the job is received from the first computer, and inputting or re-inputting into a second computer, which is different from the first computer, the request for execution of the job, when a determination is made to execute the job again.

10. The information processing system according to claim 9, wherein the process executed by the processor further includes:
selecting the second computer having a computation resource whose state enables the execution of the job from among the plurality of computers having computation resources before the request for execution of the job is input or re-input into the second computer.

11. The information processing system according to claim 9, wherein the process executed by the processor further includes:
causing the first computer to activate the virtual machine when the virtual machine is not activated on the first computer.

12. The information processing system according to claim 11, wherein the process executed by the processor further includes:
causing the virtual machine to output to the second computer on which the virtual machine operates an execution result of the job that has been input into the virtual machine in response to the request for execution of the job input or re-input into the second computer, and
causing the second computer to notify the processor of the execution result of the job that has been output to the second computer on which the virtual machine operates.

13. The information processing system according to claim 12, wherein the process executed by the processor further includes:
causing the virtual machine to store the execution result of the job that has been input or re-input into the virtual machine, and
wherein, when the request for execution of the job is input or re-input into the second computer, the execution result of the job stored by the virtual machine is transmitted to the second computer.

14. The information processing system according to claim 9, wherein the process executed by the processor further includes:
determining whether a state of a computation resource of the first computer is a state in which execution of the job corresponding to the request for the execution of the job input into the first computer can be continued on the first computer; and
when it is not determined that execution of the job can be continued, causing the first computer to stop execution of the job.

15. The information processing system according to claim 14, wherein the selecting procedure includes selecting the second computer into which the job stopped by the first computer can be re-input.

16. The information processing system according to claim 9, wherein the storing of the identifier of the job further includes storing an address of a storage location of an image file of the virtual machine, a name of the image file, and a network identifier of the first computer, associated with each other.

17. A job managing method for managing a job executed by a plurality of computers, comprising:
inputting or re-inputting into a first computer, which is operated by a first operating system, a request for execution of the job, wherein said first computer includes a virtual machine operated by a second operating system independent of the first operating system;
executing the job in the virtual machine using the second operating system;
storing an identifier of the job and information about a current state of the first computer associated with the identifier in a memory shared by the plurality of computers,
determining whether to execute the job again by referring to the information about the current state of the first computer corresponding to the information which identifies the job, when a notice of an end of the job is received from the first computer, and
inputting or re-inputting into a second computer, which is different from the first computer, the request for execution of the job, when a determination is made to execute the job again.

18. The job managing method according to claim 17, further comprising:
selecting the second computer having a computation resource whose state enables the execution of the job from among the plurality of computers having computation resources before the request for execution of the job is input or re-input into the second computer.

19. The job managing method according to claim 17, further comprising:
causing the first computer to activate the virtual machine when the virtual machine is not activated on the first computer.

20. The job managing method according to claim 19, further comprising:
causing the virtual machine to output to the second computer on which the virtual machine operates an execution result of the job that has been input into the virtual machine in response to the request for execution of the job input or re-input into the second computer; and
causing the second computer to notify the processor of the execution result of the job that has been output to the second computer on which the virtual machine operates.

* * * * *